Nov. 30, 1954 — M. O. PETROFF — 2,695,516
APPARATUS FOR DETECTING AND MEASURING UNBALANCE IN ROTATING BODIES
Filed Aug. 5, 1950 — 3 Sheets-Sheet 2

Inventor:
Merlin O. Petroff
By Hinkle, Horton, Ahlberg & Wupper
Attorneys.

Inventor:
Merlin O. Petroff
By Hinkle, Horton, Ahlberg & Wupper
Attorneys.

United States Patent Office 2,695,516
Patented Nov. 30, 1954

2,695,516

APPARATUS FOR DETECTING AND MEASURING UNBALANCE IN ROTATING BODIES

Merlin O. Petroff, Round Lake, Ill., assignor to Stewart-Warner Corporation, Chicago, Ill., a corporation of Virginia Application August 5, 1950, Serial No. 177,827

18 Claims. (Cl. 73—66)

This invention relates generally to apparatus for balancing rotary devices, and more specifically to instruments for locating and measuring unbalanced conditions in such devices by picking up and analyzing vibrations produced by the devices when they are rotating.

It is an object of this invention to provide an apparatus whereby indications of the location and magnitude of such unbalanced conditions are produced upon the screen of a cathode ray oscilloscope tube.

A further object is to provide an apparatus producing such indications in the form of radial pulse-like traces of light on the tube face, having directions and lengths indicative of the location and magnitude of unbalance, respectively.

A further object is to provide an apparatus indicating unbalanced conditions in a rotary part at the vibratory resonant frequency of the part and its supporting structure.

A further object is to provide apparatus which produces such a resonance indication which may be observed after passing through the resonant condition.

A further object is to provide balancing apparatus which can readily be calibrated, both as to direction and magnitude indications, under static conditions.

A further object is to provide such balancing apparatus having outstanding characteristics with respect to simplicity, reliability and economy.

Further objects, advantages and principles of this invention will be apparent from the following description of several illustrative embodiments, taken in connection with the drawings, in which.

In balancing rotatable wheels, gears, rotors and other machine parts, it is known practice to determine the location and magnitude of the eccentric, unbalanced material in the part by rotating the part and then picking up and analyzing the vibrations produced in the structure supporting the part.

Figure 1:
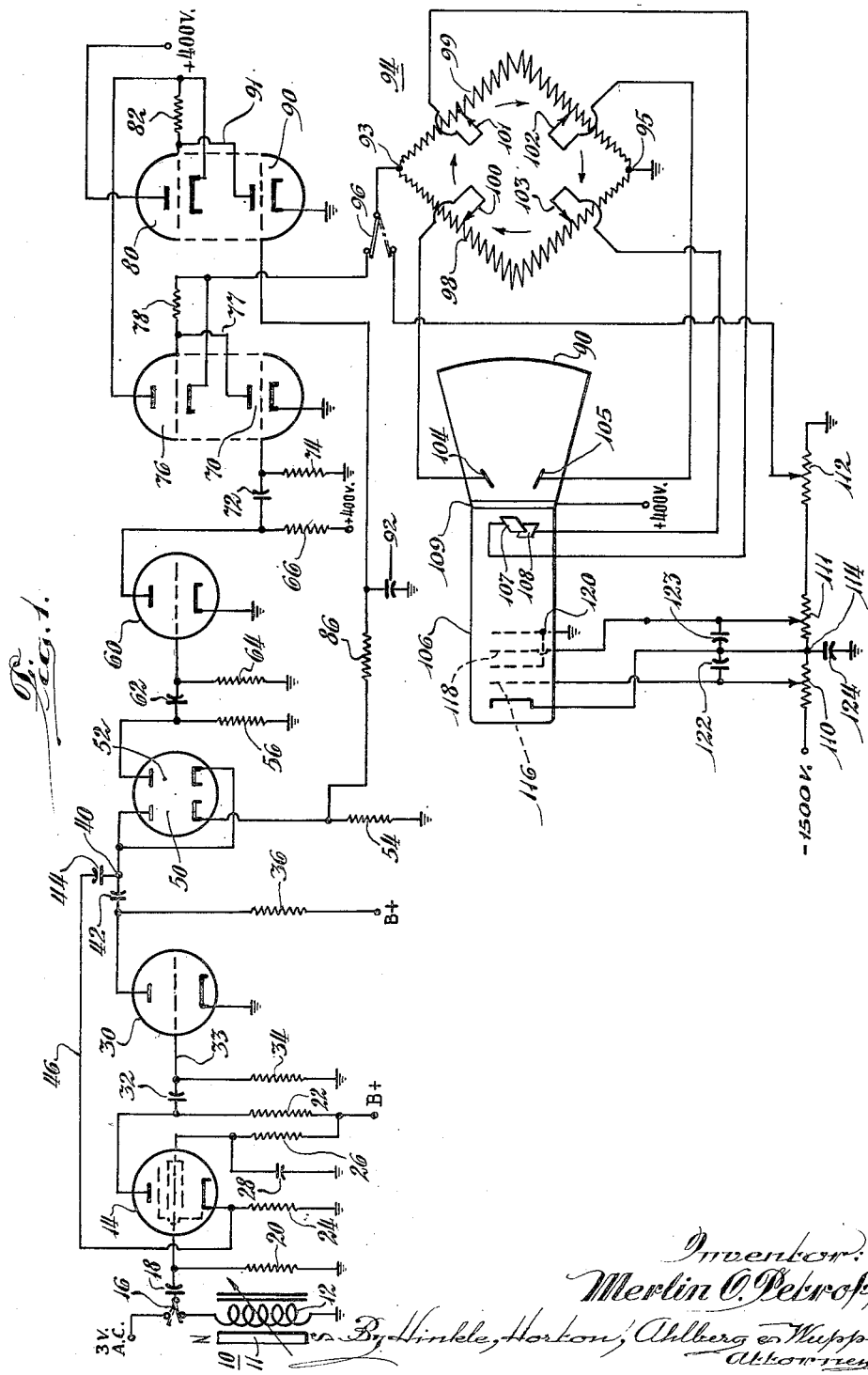
Fig. 1 is a schematic wiring diagram of an illustrative embodiment of the invention.

In Fig. 1 a vibration pickup 10 is shown which may be of any type suitable for picking up vibrations from the supporting structure of a rotating part. In the particular pickup 10 illustrated, the vibrations produce relative motion of a permanent magnet 11 and an inductance coil 12 and induce voltages indicative of the velocity of the vibrations in the coil 12. Other types of pickups which may be employed include displacement responsive crystal, carbon button or capacitance pickups, velocity responsive pickups of the magnetic induction type, and acceleration responsive or inertia type pickups, for example.

One output terminal of the pickup 10 is grounded, and the other is adapted to be connected with the control grid of an amplifier pentode 14 by a single pole double throw switch 16 in series with a capacitor 18. A grid resistor 20 connects the grid of the pentode 14 with ground.

The plate of the pentode 14 is connected with a suitable plate potential terminal B+ by a load resistor 22. An unbypassed resistor 24, connecting the cathode of the pentode 14 with ground, provides grid bias and negative feedback. In the conventional manner, the screen of the pentode 14 is connected with the B+ terminal by a resistor 26 and is bypassed to ground through a capacitor 28.

The pentode 14 is connected conventionally to serve as a first voltage amplification stage. The plate of the pentode 14 is coupled with the grid of an amplifier triode 30 by a blocking capacitor 32 and a conductor 33, and the grid is returned to ground through a resistor 34. The cathode of the triode 30 is grounded and the plate is connected with a suitable plate potential terminal B+ through a load resistor 36. The grid resistor 34 has a high resistance of several megohms so that cathode bias is not required.

The plate of the amplifier triode 30 is connected with a terminal 40 by a blocking capacitor 42, and the terminal 40 is connected, through a capacitor 44 and a conductor 46, with the cathode of the amplifier pentode 14, in order to provide negative feedback. The circuit components of the two-stage voltage amplifier, comprising the pentode 14 and the triode 30, are proportioned to provide substantially uniform amplification and negligibly small phase shift throughout the operating frequency range of the apparatus.

The terminal 40 is also connected with the plate of a rectifier diode 50, and also with the cathode of a second rectifier diode 52. The diodes 50 and 52 may be contained in a single envelope as shown. The cathode of the first diode 50 and the plate of the second diode 52 are connected to ground through load resistors 54 and 56, respectively.

The plate of the diode 52 is connected with the grid of an ampilfier triode 60 through a current limiting capacitor 62, and the grid of the triode is returned to ground through a resistor 64. The plate of the triode 60 is connected with a suitable plate voltage terminal +400 v. through a load resistor 66, and the cathode of the triode is grounded. The grid resistor 64 has a relatively high value so that cathode biasing is unnecessary.

The plate of the triode 60 is connected with the grid of a triode 70 through a current limiting capacitor 72, and the grid of the triode is returned to ground through a resistor 74.

The cathode of the triode 70 is grounded and the plate of the triode is directly connected by a conductor 77 with the grid of a triode 76. The grid of the triode 76 is connected with the cathode of the triode by a resistor 78 and the plate of the triode is connected with the cathode of a triode 80. As shown, the triodes 70 and 76 may be contained in one envelope.

The plate of the triode 80 is connected with a suitable plate potential terminal +400 v., and the grid of the triode is connected with its cathode by a resistor 82.

The cathode of the rectifier diode 50 is connected through a filtering resistor 86 with the grid of a triode 90, and the grid is bypassed to ground by a filter capacitor 92. The cathode of the triode 90 is grounded, and the plate is directly connected by a conductor 91 with the grid of the triode 80. The triodes 80 and 90 may have a common envelope, as shown.

The cathode of the triode 76 is adapted to be connected with an input terminal or conductor 93 of a bridging potentiometer 94 by a single pole double throw switch 96. The potentiometer 94 comprises a pair of resistance arms 98 and 99 connecting the terminal 93 to a grounded conductor or terminal 95 and forming a closed electrical loop. The potentiometer 94 includes four equally spaced conducting output brushes or contactors 100 through 103, and the resistance loop 98, 99, including the conductors 93 and 95, and the brushes are relatively rotatable.

Two diametrically opposite brushes 100 and 102 are connected with the vertically deflecting plates 104 and 105 of a cathode ray oscilloscope tube 106, and the other diametrically opposite brushes 101 and 103 are connected with the horizontally deflecting plates 107 and 108 of the cathode ray tube 106. The accelerating ring 109 of the cathode ray tube 106 is connected with a suitable positive voltage terminal +400 v.

The other operating voltages of the cathode ray tube 106 are derived from a suitable negative voltage terminal —1500 v. which is connected to ground through three potentiometers 110, 111 and 112 connected in series. The junction 114 of the potentiometers 110 and 111 is connected with the cathode of the tube 106, and the sliders of the potentiometers 110 and 111 are connected with the grid 116 and the first anode 118, respectively, of the cathode ray tube. The second anode 120 of the tube 106 is grounded.

The grid 116 and the first anode 118 are bypassed to the cathode of the tube 106 by suitable capacitors 122 and 123, respectively, and the cathode is bypassed to ground by a capacitor 124.

The slider of the potentiometer 112 is adapted to be connected with the input terminal 93 of the potentiometer 94 by the single pole double throw switch 96.

The switch 16 is adapted to connect a low voltage alternating current terminal 3 v. A. C. which may be a tube heater terminal, with the grid of the pentode 14 through the blocking capacitor 18.

Figure 4:
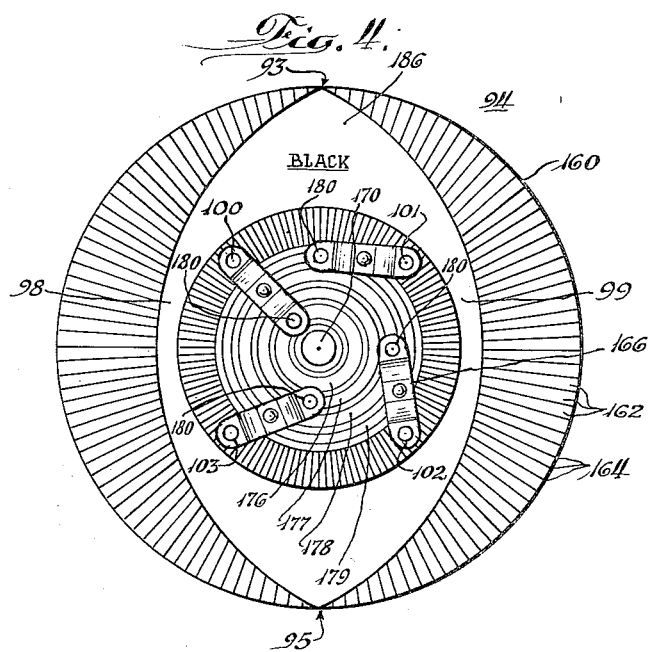
Fig. 4 is a front elevational view of a synchronizing potentiometer forming a part of the embodiment.
Figure 5:
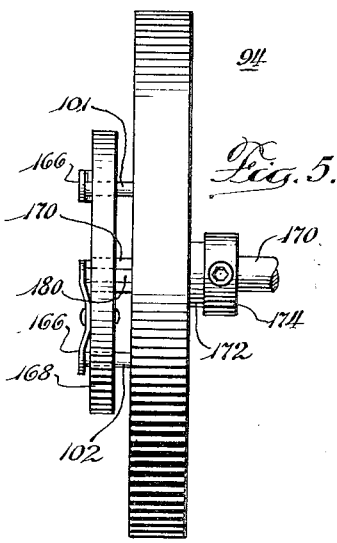
Fig. 5 is a side elevational view of the potentiometer.

The potentiometer 94 may be constructed as shown in Figs. 4 and 5. It comprises a generally disc-shaped commutator 610 having a plurality of contact segments 162 separated in the conventional manner by insulating spacers 164. The brushes 100—103 comprise round carbon rods which are pressed into contact with the inner portion of the commutator 160 by four flat springs 166. The brushes are guided by a disc-shaped insulating brush holder 168 to which the springs 166 are secured by rivets passing through the centers of the springs. The brush holder 168 is fixed to a shaft 170 which is rotatably mounted in a bearing 172. A thrust collar 174 adjustably fixed to the shaft maintains the springs 166 in flexed positions to provide proper pressure between the brushes 100—103 and the commutator 160.

Connections to the brushes 100—103 are made through four concentric slip rings 176—179, positioned flush with the commutator 160 between the commutator and the bearing 172. Four brushes 180 are pressed into contact with the four slip rings by the springs 166, and also are respectively connected with the brushes 100—103 by the springs.

In order to show the brushes, springs and slip rings clearly, the brush holder 168 is omitted from Fig. 4.

A thin layer of resistance paint 186, of the type used for printed circuits (such for example, as colloidal graphite known as "Aquadag"), is applied to a portion of the surface of the commutator 160 to produce the resistance arms 98 and 99. The resistance element 98, 99 is in the form of a generally circular printed loop or band 186 of graduated width.

The outer boundary of the band 186 is generally in the shape of the cross-section of a football, as shown, and the inner boundary is circular. The input terminals 93 and 95 of the potentiometer 94 are connected with the particular segments 162 contacting the resistance band 186 at its widest points, as indicated.

In operation, the shaft 170 of the potentiometer is connected for concurrent rotation with the part or device that is to be balanced. Thus the brushes 101—103 rotate in synchronism with the part to be balanced, while the commutator 160 remains stationary.

If a direct current voltage is applied to the input terminals 93 and 95 of the potentiometer 94, and the brushes 100—103 are rotated, alternating voltages are produced between opposite brush pairs. The direct current voltage may be supplied, for calibration purposes, by operating the switch 96 to its dotted line position and thereby connecting the slider of the potentiometer 112 with the input terminal 93. The alternating output voltages have maximum values when opposite brush pairs contact the particular segments 162 connected with the input terminals 93 and 95, and minimum values when the brushes contact segments spaced 90° from the input terminals. Polarity reversal occurs once during each revolution of the brushes so that alternate negative and positive peaks are produced. The resistance band 186 is tapered generally in the form illustrated, in order to provide substantially sinusoidal output voltages.

Because the two sets of brush pairs are spaced at 90° intervals, the voltage between the brushes 100 and 102 is 90° out of phase with the voltage between the brushes 101 and 103. These voltages are applied to the vertical and horizontal deflecting plates of the cathode ray tube 106, respectively, and a circular light trace or pattern is produced upon the face 190 of the tube.

However, a steady direct current voltage is applied to the potentiometer 94 only for calibration purposes. The switch 96 normally is set in its full line position connecting the potentiometer 94 with the cathode of the triode 76. This connection provides pulse signals for the potentiometer 94 in a manner which will now be described.

The pickup 10 is secured to some stationary member supporting the rotatable apparatus to be balanced. The unbalanced apparatus is rotated by some suitable means, and vibrations caused by the unbalanced condition are transmitted to the pickup 10 and produce output voltages which are usually substantially sinusoidal in wave form.

The output voltage from the pickup 10 is transmitted to the amplifier pentode 14 by the switch 16, which normally is in its full line position. The amplifier pentode 14 and triode 30 provide substantially faithful amplification of the vibration signals, since the amplification stages comprising the pentode 14 and triode 30 are designed to provide substantially flat frequency response and substantially zero phase shift throughout the operating frequency range of the balancing apparatus.

If desired, the inductance of the pickup coil 12 and the values of the capacitor 18 and the resistor 20 may be proportioned to provide a 90° phase shift between the voltage induced in the pickup coil 12 and the voltage drop across the resistor 20.

This may be of advantage in some embodiments of the invention in view of the fact that the voltage generated in the velocity responsive pickup 10 is at its maximum (positive or negative, depending on the direction in which the coil is wound) when the velocity of the vibrating part is greatest, and this occurs at the center of the vibratory stroke. On the other hand, in an acceleration responsive pickup, the maximum voltage is generated at one end of the vibratory stroke. The positions at which maximum voltages are generated by these two types of pickups thus differ by a 90° phase angle. Furthermore, there are complicated relations between the speed of revolution of a rotor and the vertical displacement of the vibratory part produced by an unbalanced condition in the rotor.

Assume that an eccentric weight is added to an otherwise perfectly balanced rotor, and the latter is rotated at a constantly increasing speed. If the rotor is then viewed while being illuminated by a Strobotron or stroboscope which flashes for an instant in response to the peak of the voltage generated by a velocity type pickup attached to the bearing for the unbalanced rotor, it will be found that the weight added to the rotor will, at low speeds, appear to be at the bottom (6:00 o'clock) of the rotor. At the critical speed, at which the vibration is at a maximum, the weight will appear to be displaced by an angle of 90° (3:00 o'clock or 9:00 o'clock), whereas when the critical speed is substantially exceeded, the weight will appear at the top of the rotor (12:00 o'clock). On the other hand, if an acceleration responsive or inertia type pickup were employed and the assumed experiment repeated, the apparent position of the weight would be displaced by 90° as compared with its apparent position when using the velocity responsive pickup.

The rectifier diodes 50 and 52 are connected in a conventional half-wave rectification circuit providing negative half-wave pulses at the plate of the diode 52 and positive half-wave pulses at the cathode of the diode 50.

The negative pulses are differentiated or sharpened by the current-limiting capacitor 62 and the resistor 64. The differentiated pulses are amplified by the triode 60 to provide pulses of similar wave form at the plate of the triode.

A second stage of differentiation and sharpening is provided by the current limiting capacitor 72 and the grid resistor 74, so that the pulses applied to the grid of the triode 70 are extremely sharp. The duration of the pulses is extremely short with respect to their repetition period, so that their wave form is needle-like.

The triodes 70, 76, 80 and 90 comprise a gating and modulating circuit for producing extremely sharp pulses for transmission to the potentiometer 94, in synchronism with the pulses upon the grid of the triode 70, and having magnitudes generally proportional to the amplitude of the vibration signal produced by the pickup 10.

It will be noted that a series circuit may be traced from the +400 v. terminal to the plate of the triode 80, the cathode of the triode 80, the plate of the triode 76, the cathode of the triode 76, the switch 96 and to the potentiometer 94. This is the route by which pulses are transmitted to the potentiometer 94 to modulate the circular sweep of the electron beam.

It will be noted that the plates of the triodes 70 and 90 are connected with the grids of the triodes 76 and 80, respectively, and thence with the cathodes of the triodes 76 and 80 through the resistors 78 and 82, respectively. Any plate currents flowing in the triodes 70 and 90 must pass through the resistors 78 and 82, respectively, which thereby form load resistances for the triodes 70 and 90, respectively.

The resistors 78 and 82 have relatively high values and under zero signal conditions voltage drops across the resistors are nearly sufficient to cut off the plate currents of the triodes 76 and 80, respectively.

Thus, under zero signal conditions, a very small current flows through the potentiometer, and very small voltages are produced for transmission to the deflecting plates of the cathode ray tube 106. These small voltages may produce small circular traces 192, shown at the center of the tube faces illustrated in Figs. 2 and 3.

It has been found that pulses having peak amplitudes in the order of 15 to 20 volts applied to the grid of the triode 76, produce substantial conduction in the triode 76 for the duration of the pulses, providing a positive voltage is also applied to the grid of the triode 80 connected in series with the triode 76. The magnitude of the plate current pulses through the tubes 76 and 80 depends upon the magnitude of the positive grid voltage applied to the triode 90.

The pulses of plate current pass through the potentiometer 94 and produce voltage pulses upon the deflecting plates of the cathode ray tube 106. For the duration of a pulse, a short segment of a circle is traced upon the screen 190 of the tube 106. However, the pulses are so short that the light traces produced by the outward and inward movements of the electron spot on the screen of the tube 106 are virtually superimposed to produce a sharp radial line or spike 194 of light, as indicated in Fig. 3.

Figure 2:
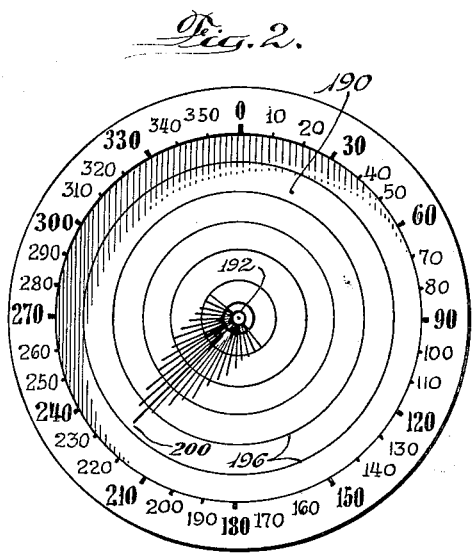
Fig. 2 is a representation of a typical pattern which may appear upon the screen of the cathode ray tube.
Figure 3:
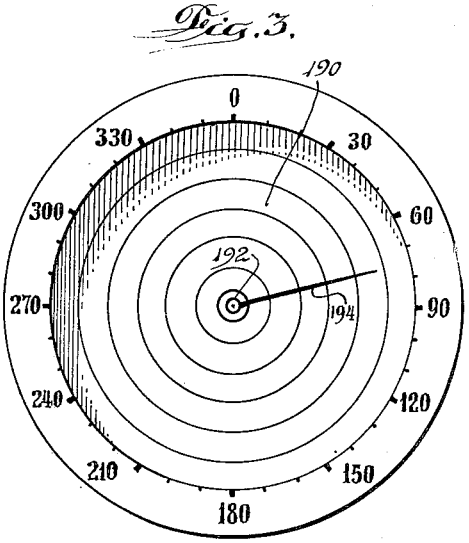
Fig. 3 is a representation of another typical pattern produced under somewhat different conditions of operation.

As shown in Figs. 2 and 3, the screen 190 of the cathode ray tube 106 is provided with a peripheral scale graduated in degrees. A plurality of concentric circular marks 196 may be provided on the face of the screen 190, or on a transparent window protecting the screen, for indicating the relative length of radial traces or pips which may be produced by the tube 106.

A positive voltage substantially proportional to the amplitude of the vibration signals is derived from the cathode of the diode 50 and is impressed upon the grid of the triode 90 by the filtering mesh comprising the resistor 86 and the capacitor 92, which filter out a portion of the alternating current component of the voltage appearing upon the cathode of the diode 50. The grid of the triode 90 is thereby furnished with a direct current voltage substantially proportional to the amplitude of the vibrations received by the pickup 10, and the plate current pulses transmitted to the potentiometer 94, and hence the length of the radial pips on the screen of the cathode ray tube 106, are generally proportional to the amplitude of the vibrations.

Because of the synchronization of the potentiometer 94 with the rotating device that is being balanced, the direction of each radial trace on the screen of the tube 106 has a definite relationship with the position of the rotating device, at the instant the pulse is produced. This relationship may be determined, for calibration purposes, by stopping the rotating part and moving the switch 16 to its dotted line position. A small alternating voltage at the power line frequency is then applied to the pentode 14, and sharp pulses at the same frequency are supplied to the potentiometer 94, producing radial traces on the screen of the cathode ray tube 106. The radial traces are stationary if the brushes are stationary, with respect to the resistance arms 98 and 99, and the direction of the superimposed radial traces depends upon the position of the brushes with respect to the resistance element of the potentiometer.

A zero or reference position of the device to be balanced may be established by rotating the device manually until the radial trace points to the zero index on the angular scale around the edge of the screen of the cathode ray tube 106.

It is known that the phase of the vibrations produced by an unbalanced rotating part bears a definite relationship with the location of the center of unbalance of the part, when the part is rotating at the particular speed which produces vibratory resonance of the part, together with its supporting structure. For this reason it is usually desirable to secure vibratory indications of the unbalanced condition of a part when the part is rotating at the resonant speed.

The amplitude of the vibrations is usually the greatest at the resonant speed, and it is usually possible to adjust the speed to resonance if an indication of the magnitude of the vibrations is available.

Thus, in one mode of the operation of the apparatus of this invention, the speed of the unbalanced body is adjusted to produce a radial trace upon the screen of the cathode ray tube having a maximum length. The trace may then appear as indicated in Fig. 3, as a single radial line of light which comprises several superimposed traces of the electron beam. The angular direction of the radial line is an indication of the locus of the center of unbalance of the body.

The exact relationship between the direction of the radial line and the locus of unbalance depends upon the placement of the pickup and upon whether a displacement, velocity, or acceleration responsive pickup is used. The exact effect of these factors is well known to those skilled in the art, and so a more detailed consideration of the relationship of the direction of the radial line to the locus of unbalance will not be undertaken in this specification.

The pulses which are reproduced upon the screen of the cathode ray tube 106 may be timed by the apparatus of this invention to occur substantially at the beginning of the alternate half cycles of the voltage produced by the pickup, for example. For the same pickup and the same location thereof, the relationship of the direction of the radial line at resonance and the position of the locus of unbalance is always the same. It may be desirable to rotate the cathode ray tube 106 relative to the angular scale around the screen of the tube in order to obtain a direct reading of the location of the center of unbalance.

No matter what conditions of vibration pickup exist, it is always very easy to determine, with the apparatus of this invention, the exact position of the unbalanced body at the time that a vibratory pulse is produced upon the screen of the tube 106. The angular direction of the radial line is observed while the unbalanced body is rotating. Then the unbalanced body is stopped and the switch 16 is operated to its dotted line position to obtain a series of sharp pulses at the power line frequency for transmission to the potentiometer 94. The unbalanced body is then turned manually until the radial line on the screen of the tube 106 again points in the observed direction. The unbalanced body is then in exactly the same angular position as it was when the vibratory pulse was produced while the body was rotating.

In another mode of operation of the apparatus of this invention, the unbalanced body is rotated at a speed known to be somewhat greater than the resonant speed, and the means producing the rotation is then disconnected from the body. Of course the speed of the unbalanced body gradually decreases and eventually reaches zero.

As the speed of the unbalanced body decreases the phase of the vibrations gradually changes, with respect to the location of the center of unbalance, and the timing of the pulses, which produce the radial pips on the screen of the tube 106, correspondingly changes. Therefore, the direction of the radial traces on the screen of the cathode ray tube changes progressively for successive revolutions of the unbalanced part. The amplitude of the vibrations, and hence the length of the successive radial traces, increase as resonance is approached and then decrease after the resonant speed is passed.

The screen of the cathode ray tube 106 preferably has a relatively long fluorescent persistence, so that a number of these successive radial traces of the electron beam may be observed simultaneously, as indicated in Fig. 2. The radial light traces tend to crowd in toward the longest trace 200, which indicates the phase of the vibrations at resonance, because the phase of the vibrations usually changes more gradually near resonance than elsewhere.

Usually the resonance is sufficiently broad so that several successive radial traces, occurring near the resonant speed, are virtually superimposed upon the screen of the tube 106, producing a very prominent long bright line 200 as indicated in Fig. 2. The long persistence fluorescent screen permits the observation of the phase of the vibrations at resonance a substantial time interval after the actual resonant condition has been passed.

The rotation of the brush holder 168 of the potentiometer 94 may be synchronized in various ways with the rotary part to be balanced. The shaft 170 of the potentiometer 94 may be mechanically connected with the shaft of the rotary unbalanced part. For balancing the parts of an automotive internal combustion engine, the shaft 170 of the potentiometer 94 may readily be connected with the vibration damper, for example, which is commonly attached to the front end of the crank shaft. Optionally, the shaft 170 of the potentiometer 94 may be connected with the rotatable unbalanced body by means of a flexible shaft.

If a rotatable device such as an automobile wheel is to be balanced, the potentiometer shaft 170 may be connected with the wheel, for synchronized rotation, by means of a rubber cup, for example, connected with the shaft 170 and pressed against the center of the hubcap of the wheel.

The apparatus of this invention is especially valuable when the part to be balanced is located in an out of the way portion of an apparatus such as an automobile engine, because the unbalanced part need not be observed to obtain an indication of the location of the center of unbalance. With the apparatus of this invention, the part may be adjusted to resonant speed, the direction of the radial line on the face of the tube may be observed, and then the rotation of the part may be stopped and the part turned manually until the radial trace on the tube face, produced by the power line frequency pulses, extends in the observed direction. The position of the part is then an indication of the locus of the center of unbalance.

Another important advantage of this invention is the production of indications of both the magnitude and location of an unbalanced condition upon a single indicating screen. With the apparatus of this invention it is not necessary for an operator to attempt to observe two different sets of indications simultaneously.

Figure 6:
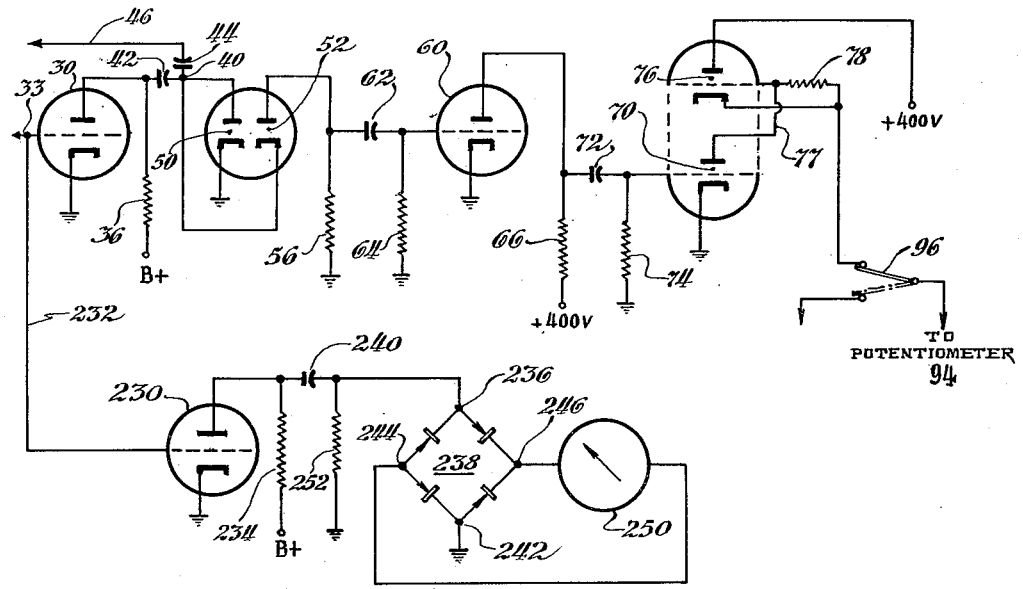
Fig. 6 is a fragmentary schematic wiring diagram of a modification of the embodiment shown in Fig. 1.

A partial circuit diagram of a modification of the apparatus of Fig. 1 is shown in Fig. 6. Only the portion of the complete circuit of the modification is shown which is necessary to illustrate the differences between the modification and the embodiment of Fig. 1, and the portions of the circuit which are not shown may be the same as the corresponding portions of the apparatus of Fig. 1.

Fig. 6 illustrates the diodes 50 and 52 and triodes 30, 60, 70 and 76. Resistors 36, 56, 64, 66, 74 and 78, together with the capacitors 42, 44, 62 and 72 and the switch 96, are also illustrated. With the exceptions described below, these components are all similar to the similarly designated components of the apparatus of Fig. 1, and they are interconnected in a similar manner.

In the apparatus of Fig. 6, the cathode of the diode 50 is connected directly to ground, and the cathode resistor 54 of Fig. 1 is omitted. The triodes 80 and 90 of Fig. 1, together with the resistors 82 and 86 and the capacitor 92, are omitted from the apparatus of Fig. 6. The anode of the triode 76 is connected directly to a suitable anode voltage source, indicated as a terminal +400 v. rather than to the cathode of the triode 80.

The grid of a triode 230 is connected with the grid of the triode 30 by a conductor 232. The cathode of the triode 230 is grounded and the plate is connected to a suitable plate voltage terminal B+ through a load resistor 234.

The plate of the triode 230 is coupled to an input terminal 236 of a full wave bridge type meter rectifier 238 by a capacitor 240, and the other input terminal 242 is grounded. The output terminals 244 and 246 of the rectifier 238 are connected with a direct current voltmeter 250. The input terminal 236 of the rectifier 238 is connected to ground through a resistor 252.

In the apparatus of Fig. 6, pulses synchronized with the signals from the pickup 10 are impressed upon the grid of the triode 70 in a manner similar to that described in connection with Fig. 1. The pulse signals are amplified by the triode 70 and impressed across the grid and the cathode of the triode 76 by means of the load resistor 78 to produce momentary conduction in the triode 76. Positively polarized pulses are thereby impressed upon the potentiometer 94 which acts as a load resistance for the triode 76 in a manner similar to that described in connection with Fig. 1.

As in the case of the apparatus of Fig. 1, the pulses impressed upon the potentiometer 94 produce radial pips or traces upon the screen of the cathode ray tube 106, and the angular direction of the traces is indicative of the phase relationship between the rotations of the unbalanced rotor connected with the potentiometer shaft 170 and the vibrations produced in the supporting structure for the rotor and received by the pickup 10. Consequently, the direction of the radial traces on the screen of the cathode ray tube 106 provides an indication of the location of the center of unbalance of the rotor, particularly if the traces are observed when the rotor is rotating at the speed producing vibratory resonance, all as previously described.

The components of the apparatus of Fig. 6 may be proportioned so that the amplitude of the pulses appearing across the potentiometer 94 is a function of the magnitude of the signals produced by the pickup 10. In this mode of operation the triodes 60, 70 and 76 are operated at low enough levels so that a fairly linear response is obtained. The traces produced on the screen of the cathode ray tube 106 may not be quite so sharp as those produced in the apparatus of Fig. 1, in which the triodes 70 and 76 are greatly overdriven to produce a switching effect.

However, by proportioning the components of Fig. 6 so that the magnitude of the pulses impressed upon the potentiometer 94 is a function of the amplitude of the signals from the pickup 10, the length of the radial traces on the screen of the cathode ray tube 106 gives an indication of the magnitude of the vibrations received by the pickup. Consequently indications of both the location of the center of unbalance and the magnitude of the vibrations are provided on the screen of the cathode ray tube 106, and all of the previously described advantages of this arrangement are obtained.

On the other hand, if the sharpest possible traces on the screen of the cathode ray tube 106 are desired, it is preferable to proportion the components of the apparatus of Fig. 6 so that the triodes 70 and 76 operate as a switching means to provide extremely short pulses upon the potentiometer 94 in the manner of the apparatus of Fig. 1. Under these circumstances the amplitude of the pulses impressed upon the potentiometer is relatively constant within the normal range of variation of the magnitude of the signals from the pickup.

Of course, the amplitude of the vibrations is indicated by the readings of the voltmeter 250. The triode 230 is connected as a conventional voltage amplifier, and the voltage input to the rectifier 238 is thus substantially proportional to the amplitude of the vibrations. Therefore, the rectified current indications of the meter 250 are directly related to the amplitude of the vibrations. The speed of the unbalanced body may be adjusted to resonance by obtaining a maximum reading on the meter 250. The direction of the superimposed radial traces on the screen of the cathode ray tube 106 then is an indication of the location of the center of unbalance of the body.

In Fig. 1, the portion of the apparatus extending from the cathode of the diode 52 to the grid of the triode 70, including the diode 52 and the triode 60, constitutes a pulse generator for producing needle sharp pulses in response to the amplified vibration signals derived from the amplifier triode 30. The construction and operation of the particular pulse generator illustrated are generally conventional, and other equivalent pulse generators may be substituted for the one illustrated.

The portion of the apparatus extending from the grid of the triode 70 to the cathode of the triode 76 and including the triodes 70, 76, 80 and 90 constitutes an improved modulator circuit for modulating the electron beam pattern, produced by the oscillograph and the potentiometer, in response to the pulses supplied by the pulse generator.

The modulator circuit may be subdivided into a gating or swiching circuit comprising the triodes 70 and 76, and an amplitude controlling circuit comprising the triodes 80 and 90. Because of the series connection of the triodes 76 and 80, both the switching circuit and the amplitude controlling circuit must be energized to produce radial traces upon the screen of the cathode ray tube.

Although the particular improved modulator circuits illustrated are especially advantageous, an operative balancing apparatus may be produced if a more conventional modulator circuit is substituted for the one illustrated. For example, conventional cathode follower circuits might be employed in the modulator circuit.

The bridging potentiometer 94 constitutes an improved form of electrical converter for producing a two-phase electrical output synchronized with the rotation of the body to be balanced. Some of the advantages of this invention may be obtained if conventional polyphase generators are substituted for the potentiometer. For example, a circular sweep of the electron beam, synchronized with a rotating part, may be obtained by the use of a conventional two-phase electromagnetic or electrostatic generator connected with the rotating body for concurrent rotation.

Figure 7:
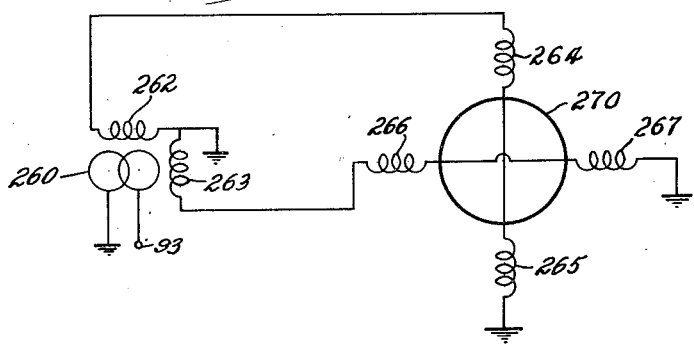
Fig. 7 is a diagrammatic view of means for producing voltages to effect circular travel of the cathode ray beam.

The deflecting plates of the cathode ray tube 106 constitute one known form of deflecting elements. In some cases a cathode ray tube having horizontally and vertically deflecting magnetic coils might be substituted for the electrostatically deflected tube, as diagrammatically illustrated, for example, in Fig. 7. In this figure a two-phase generator having a rotor 260 driven in synchronism with the rotating body has windings 262 and 263 in quadrature. The winding 262 is connected in series with two vertical deflecting coils 264 and 265, while the winding 263 is connected in series with horizontal deflecting windings 266 and 267 of a cathode ray tube 270. The input terminals of the rotor 260 are connected respectively to ground and a terminal 93, which is the same terminal 93 shown in Fig. 1 and which receives the sharp signal pulses in synchronism with the vibrations of the rotating body.

The potentiometer 94 together with the deflecting plates 104, 105, 107 and 108 constitute an apparatus for producing a rotating field in the cathode ray tube capable of deflecting the electron beam of the tube along a circular path. Some of the advantages of this invention may be obtained if other apparatus, capable of producing a rotating beam deflecting field is substituted for the apparatus shown. For example, a rotatably mounted magnetic deflecting yoke or coil might be provided around the tube, together with mechanical means for rotating the yoke in synchronism with the rotations of the body.

While I have shown and described preferred embodiments of my invention, it will be apparent that numerous variations and modifications thereof may be made without departing from the underlying principles of the invention. I, therefore, desire, by the following claims, to include within the scope of the invention all such variations and modifications by which substantially the results of my invention may be obtained through the use of substantially the same or equivalent means.

I claim:

1. Apparatus for indicating the angular position of the center of unbalance of a rotating body, comprising a vibration pickup for producing electrical signals in response to vibrations of the body, a cathode ray oscilloscope having electron beam deflecting means, apparatus mechanically connected to the rotating body so as to be rotated in synchronism therewith and providing electrical signals upon the deflecting means of the oscilloscope which are in 90° phase relation, thereby to move the electron beam of the oscilloscope along a generally circular path, and electric circuits connecting the pickup with said apparatus to increase the voltage of the output thereof thereby to change the pattern produced by the electron beam cyclically in response to the electrical signals from the pickup.

2. Apparatus for indicating the angular position of the center of unbalance of a rotating body supported by a bearing comprising a vibration pickup adapted to be connected to said supporting bearing for producing electrical signals in response to the vibrations of the body, a cathode ray oscilloscope having electron beam deflecting means, alternating current voltage producing means connected to and mechanically driven in synchronism with the rotating body and having outputs connected to the beam deflecting means of the oscilloscope, said outputs being in 90° phase relation thereby to cause the electron beam of the oscilloscope to trace a generally circular pattern in synchronism with rotation of the rotating body, and electric circuits connecting the pickup with the voltage producing means to effect an increase in the output voltages thereof, thereby to change the radius of the circular pattern cyclically in response to the electrical signals from the pickup.

3. An apparatus for indicating the angular location of the center of unbalance of a rotating body, comprising a vibration pickup for producing electrical signals in response to the vibrations of the body, a cathode ray oscilloscope having means for deflecting the electron beam, a polyphase electric signal producing means, means mechanically connecting the signal producing means with the rotating body to synchronize the signal producing means with the body, deflecting circuits connecting the signal producing means with the oscilloscope deflecting means for moving the electron beam of the oscilloscope to trace a generally circular pattern in synchronism with the signal producing means, and electrical circuits connected with the pickup for modulating the output of the signal producing means cyclically to change its output voltage and thereby to change the pattern traced by the electron beam of the oscilloscope in synchronous response to the vibrations of the rotating body.

4. An apparatus for indicating the angular location of the center of unbalance of a rotating body, comprising a vibration pickup for producing electrical signals in response to the vibrations of the body, a cathode ray oscilloscope having a plurality of electron beam deflecting elements, a polyphase signal producing means having a plurality of excitation input terminals, a rotatable part for connecting the signal producing means with the rotating body to synchronize the signal producing means with the body, output circuits connecting the signal producing means with the deflecting elements of the oscilloscope and moving the electron beam of the oscilloscope along a generally circular path in synchronism with the signal producing means, and electrical circuits connecting the pickup with the excitation input terminals of the signal producing means to produce cyclical variations in the path of the electron beam in synchronous response to the vibrations of the body.

5. An apparatus for indicating the angular position of the center of unbalance of a rotating body, comprising a vibration pickup for producing electrical signals in response to the vibrations of the body, a cathode ray oscilloscope having a plurality of deflecting elements, a potentiometer having a pair of resistance arms connected in parallel and two pairs of contactors, the resistance arms and contactors being mounted for relative rotation, a pair of input terminals connected with the ends of the resistance arms, a rotatable part for connecting the potentiometer with the rotating body to produce relative rotation of the resistance arms with respect to the contactors in synchronism with the body, circuits connecting the contactors with the deflecting elements for moving the electron beam of the oscilloscope to trace a generally circular path in synchronism with the rotations of the body, and electrical circuits connecting the pickup with the input terminals of the potentiometer and modulating the output of the potentiometer to produce cyclical variations in the electron beam pattern in synchronous response to the vibrations of the body.

6. An apparatus for indicating the angular position of the center of unbalance of a rotating body, comprising a vibration pickup for producing electrical signals in response to the vibrations of the body, a cathode ray oscilloscope having a plurality of deflecting elements, a potentiometer having an impedance element forming a closed electrical loop and a pair of input conductors and two pairs of output conductors contacting the impedance element, the loop and the output conductors being mounted for relative rotation, a rotatable part for connecting the potentiometer with the rotating body to produce relative rotation of the loop with respect to the output conductors in synchronism with the body, circuits connecting the output conductors with the deflecting elements for moving the electron beam of the oscilloscope around a generally circular path in synchronism with the rotations of the body, and electrical circuits connecting the pickup with the input conductors of the potentiometer and modulating the output of the potentiometer to produce cyclical variations in the path of the electron beam in synchronous response to vibrations of the body.

7. An apparatus for indicating the angular location of the center of unbalance of a rotating body, comprising a vibration pickup producing electrical signals in response to vibrations of the body, a cathode ray oscilloscope having a plurality of deflecting elements, a polyphase electric voltage producing means, a rotatable part for connecting the voltage producing means with the rotating body to synchronize the voltage producing means with the body, output circuits connecting the voltage producing means with the deflecting elements of the oscilloscope moving the electron beam of the oscilloscope along a generally circular path in synchronism with the voltage producing means, a pulse generator unit connected with the pickup producing needle sharp electrical pulses in synchronism with the electrical signals from the pickup, and a modulator unit connecting the pulse generator unit with the polyphase voltage producing means to produce radial pips in the path of the electron beam having azimuths indicating the relative phasing of the vibration and the rotation of the body.

8. An apparatus for indicating the angular location of the center of unbalance of a rotating body, comprising a vibration pickup for producing electrical signals in response to vibrations of the body, a cathode ray oscilloscope having electron beam deflecting means, deflecting apparatus mechanically coupled to the rotating body so as to be operated in synchronism therewith and producing two alternating voltages of 90° phase displacement, means connecting the output of the deflecting apparatus with the oscilloscope deflecting means for moving the electron beam of the oscilloscope along a generally circular path, a pulse generator unit having its input connected with the pickup and producing needle sharp electrical pulses in synchronous response to the electrical signals from the pickup, and a modulator unit coupled to the pulse generator unit and connected to the deflecting apparatus to change the output voltages thereof, thereby affecting the electron beam pattern cyclically in response to the pulses.

9. An apparatus for indicating the angular location of the center of unbalance of a rotating body, comprising a vibration pickup for producing electrical signals in response to vibrations of the body, a cathode ray oscilloscope having a plurality of deflecting elements, a potentiometer having an impedance element forming a closed electrical loop and a pair of input conductors and two pairs of output conductors contacting the impedance element, the loop and the output conductors being mounted for relative rotation, a rotatable part for connecting the potentiometer with the rotating body to produce relative rotation of the loop with respect to the output conductor in synchronism with the body, circuits connecting the output conductors with the deflecting elements for moving the electron beam of the oscilloscope around a generally circular path in synchronism with the rotations of the body, a pulse generator unit connected with the pickup producing needle sharp electrical pulses in synchronism with the electrical signals from the pickup, and a modulator unit connecting the pulse generator unit with the input conductors of the potentiometer and modulating the potentiometer output to produce radial spikes in the path of the electron beam having azimuths indicating the relative phasing of the vibration and rotation of the body.

10. An apparatus for indicating the angular location of the center of unbalance of a rotating body, comprising a vibration pickup for producing electrical signals in response to the vibrations of the body, a cathode ray tube having electron beam deflecting means, electric voltage producing means mechanically connected to the rotating body and electrically connected to the beam deflecting means for producing a rotating electron beam deflecting field in the tube to move the electron beam of the tube in a generally circular pattern in synchronism with the rotations of the body, a pulse generator unit connected with the pickup producing needle sharp electrical pulses in synchronous response to the electrical signals from the pickup, first and second vacuum electron discharge devices, an impedance element connecting the cathode of the second discharge device with the anode of the first discharge device, a conductor connecting the grid of the second discharge device with the anode of the first discharge device, an anode voltage source connected with the anode of the second discharge device and the cathode of the first discharge device, means connecting the grid of the first discharge device with the pulse generator unit, and means connecting the cathode of the second discharge device with the voltage producing means for producing the rotating beam deflecting field to produce pips in the electron beam pattern having azimuths indicating the relative phasing of the vibration and the rotation of the body.

11. An apparatus for indicating the angular position of the center of unbalance of a rotating body, comprising a vibration pickup for producing electrical signals in response to the vibrations of the body, a cathode ray oscilloscope having a plurality of deflecting elements, a potentiometer having an impedance element forming a closed electrical loop and a pair of input conductors and two pairs of output conductors contacting the impedance element, the loop and the output conductors being mounted for relative rotation, a rotatable part for connecting the potentiometer with the rotating body to produce relative rotation of the loop with respect to the output conductors in synchronism with the body, circuits connecting the output conductors with the deflecting elements for moving the electron beam of the oscilloscope around a generally circular path in synchronism with the rotations of the body, a pulse generator unit connected with the pickup producing needle sharp electrical pulses in synchronous response to the electrical signals from the pickup, first and second vacuum electron discharge devices, a resistance element connecting the cathode of the second discharge device with the anode of the first discharge device, a conductor connecting the grid of the second discharge device with the anode of the first discharge device, an anode voltage source connected with the anode of the second discharge device and the cathode of the first discharge device, means connecting the grid of the first discharge device with the pulse generator, and means connecting the cathodes of the respective discharge devices with the input conductors of the potentiometer to produce radial pips in the electron beam path having azimuths indicating the relative phasing of the vibration and the rotation of the body.

12. An apparatus for indicating the angular location of the center of unbalance of a rotating body, comprising a vibration pickup producing electrical signals in response to vibrations of the body, a cathode ray oscilloscope having a plurality of deflecting elements, a polyphase electric voltage producing means, a rotatable part for connecting the voltage producing means with the rotating body to synchronize the voltage producing means with the body, output circuits connecting the voltage producing means with the deflecting elements of the oscilloscope moving the electron beam of the oscilloscope along a generally circular path in synchronism with the voltage producing means, a pulse generator unit connected with the pickup producing extremely short electrical pulses relative to their repetition period in synchronism with and substantially in proportion to the electrical signals from the pickup, and a modulator unit connecting the pulse generator unit with the polyphase voltage producing means to produce radial pips in the path of the electron beam having azimuths indicating the relative phasing of the vibration and rotation of the body and having lengths generally indicating the magnitude of the vibration.

13. An apparatus for indicating the angular location of the center of unbalance of a rotating body, comprising a vibration pickup for producing electrical signals in response to vibrations of the body, a cathode ray oscilloscope having a plurality of deflecting elements, a potentiometer having an impedance element forming a closed electrical loop and a pair of input conductors and two pairs of output conductors contacting the impedance element, the loop and the output conductors being mounted for relative rotation, a rotatable part for connecting the potentiometer with the rotating body to produce relative rotation of the loop with respect to the output conductors in synchronism with the body, circuits connecting the output conductors with the deflecting elements for moving the electron beam of the oscilloscope around a generally circular path in synchronism with the rotations of the body, a pulse generator unit connected with the pickup producing electrical pulses relatively much shorter than their repetition period in synchronism with and substantially in proportion to the electrical signals from the pickup, and a modulator unit connecting the pulse generator unit with the input conductors of the potentiometer and modulating the potentiometer output to produce radial spikes in the path of the electron beam having azimuths indicating the relative phasing of the vibration and the rotation of the body and having lengths generally indicating the amplitude of the vibration.

14. An apparatus for indicating the angular location of the center of unbalance of a rotating body, comprising a vibration pickup for producing electrical signals in response to vibrations of the body, a cathode ray tube having electron beam deflecting elements, means connected to and driven in synchronism with the rotating body for producing two alternating voltages of 90° phase difference, means for conducting the output of said alternating voltage producing means to the beam deflecting elements of the cathode ray tube, thereby to cause a rotating electron beam deflecting field in the tube to move the electron beam of the tube in a generally circular pattern, a source of electrical energy for the alternating voltage producing means, a pulse responsive switching unit connected between the source and the alternating voltage producing means controlling the energization of the latter, a pulse generator unit connecting the pickup with the switching unit producing electrical pulses much shorter than their repetition period operating the switching unit in synchronism with the signals from the pickup, and an amplitude modulation unit connecting the pickup with the alternating voltage producing means varying the effectiveness of the latter generally in direct proportion to the amplitude of the electrical signals produced by the pickup, to produce radial pips in the electron beam pattern having directions indicating the relative phase of the vibration and rotation of the body and having lengths indicating generally the amplitude of the vibration.

15. An apparatus for indicating the angular location of the center of unbalance of a rotating body, comprising a vibration pickup for producing electrical signals in response to vibrations of the body, a cathode ray oscilloscope having a plurality of deflecting elements, a polyphase electric voltage producing means mechanically connected to the rotating body and electrically connected with the deflecting elements to move the electron beam of the oscilloscope in a generally circular pattern, a pulse responsive switching unit connected with the voltage producing means for controlling the energization of the deflecting elements, a pulse generator unit connecting the pickup with the switching unit producing electrical pulses much shorter than their repetition period operating the switching unit in synchronism with the signals from the pickup, and an amplitude modulation unit connecting the pickup with the voltage producing means for varying the output amplitude of the latter generally in direct proportion to the amplitude of the electrical signals produced by the pickup, to produce radial pips in the electron beam pattern having directions indicating the relative phase of the vibrations and rotations of the body and having lengths indicating generally the amplitude of the vibrations.

16. An apparatus for indicating the angular location of the center of unbalance of a rotating body, comprising a vibration pickup for producing electrical signals in response to vibrations of the body, a cathode ray oscilloscope having a plurality of deflecting elements, a polyphase electric voltage producing means mechanically connected to the rotating body and electrically connected with the deflecting elements to move the electron beam of the oscilloscope in a generally circular pattern, a source of electrical energy for energizing the voltage producing means, a pulse responsive electron discharge switching unit connected between the source and the voltage producing means controlling the energization of the latter, a pulse generator unit connecting the pickup with the switching unit producing electrical pulses much shorter than their repetition period and operating the switching unit in synchronism with the signals from the pickup, and an electron discharge modulator unit having an output circuit connected in series with the switching unit and the polyphase voltage producing means and an input circuit connected with the pickup varying the output of the polyphase voltage producing means generally in direct proportion to the amplitude of the electrical signals produced by the pickup, to produce radial pips in the electron beam pattern having directions indicating the relative phase of the vibrations and rotations of the body and having lengths indicating generally the amplitude of the vibrations.

17. An apparatus for indicating the angular position of the center of unbalance of a rotating body, comprising a vibration pickup for producing electrical signals in response to vibrations of the body, a cathode ray oscilloscope having a plurality of deflecting elements, a potentiometer having a resistance element forming a closed electrical loop and a pair of input conductors and two pairs of output conductors contacting the resistance element, the loop and the output conductors being mounted for relative rotation, a rotatable part for connecting the potentiometer with the rotating body to produce relative rotation of the loop with respect to the output conductors in synchronism with the rotations of the body, circuits connecting the output conductors with the deflecting elements for moving the electron beam of the oscilloscope around a generally circular path in synchronism with the rotations of the body, a pulse generator unit connected with the pickup producing electrical pulses much shorter than their period of repetition in synchronism with the electrical signals from the pickup, first and second vacuum electron discharge devices, a resistance element connecting the cathode of the second discharge device with the anode of the first discharge device, a conductor connecting the grid of the second discharge device with the anode of the first discharge device, means connecting the grid of the first discharge device with the pulse generator, third and fourth electron devices, a source of anode voltage, means connecting the discharge paths of the second and fourth discharge devices in series with the source and the input conductors of the potentiometer, a resistance element connecting the cathode of the fourth discharge device with the anode of the third discharge device, a conductor connecting the grid of the fourth discharge device with the anode of the third discharge device, and means connecting the grid of the third discharge device with the pickup, to produce radial spikes in the electron beam path having azimuths indicating the relative phase of the vibrations and rotations of the body and having lengths generally indicating the amplitude of the vibrations.

18. An apparatus for indicating the angular position of the center of unbalance of a rotating body, comprising a vibration pickup for producing electrical signals in response to vibrations of the body, a cathode ray oscilloscope having a plurality of deflecting elements, a potentiometer including a resistance element provided with a pair of input conductors, means including two brushes making contact with the resistance element for deriving two alternating electrical output signals from the potentiometer, a rotatable part for connecting the potentiometer with the rotating body cyclically to move the brushes along the resistance element between the input conductors, the respective brushes being moved 90° out of phase to produce a 90° phase difference between the two output signals derived by the brushes, circuits connecting the brushes with the deflecting elements for moving the electron beam of the oscilloscope to trace a generally circular path in synchronism with the rotations of the body, and electrical circuits connecting the pickup with the input conductors of the potentiometer and modulating the output of the potentiometer to produce cyclical variations in the electron beam pattern in synchronous response to the vibrations of the body.

References Cited in the file of this patent

UNITED STATES PATENTS

| Number | Name | Date |
|---|---|---|
| Re. 23,219 | Moore | Apr. 11, 1950 |
| 581,091 | Wappler | Apr. 20, 1897 |
| 2,228,266 | Gray | Jan. 14, 1941 |
| 2,382,843 | Annis | Aug. 14, 1945 |
| 2,432,029 | Manildi | Dec. 2, 1947 |
| 2,461,645 | Kallmann | Feb. 15, 1949 |
| 2,469,895 | Rogers | May 10, 1949 |
| 2,523,993 | McCandles | Sept. 26, 1950 |

FOREIGN PATENTS

| Number | Country | Date |
|---|---|---|
| 549,548 | Great Britain | Nov. 26, 1942 |